UNITED STATES PATENT OFFICE.

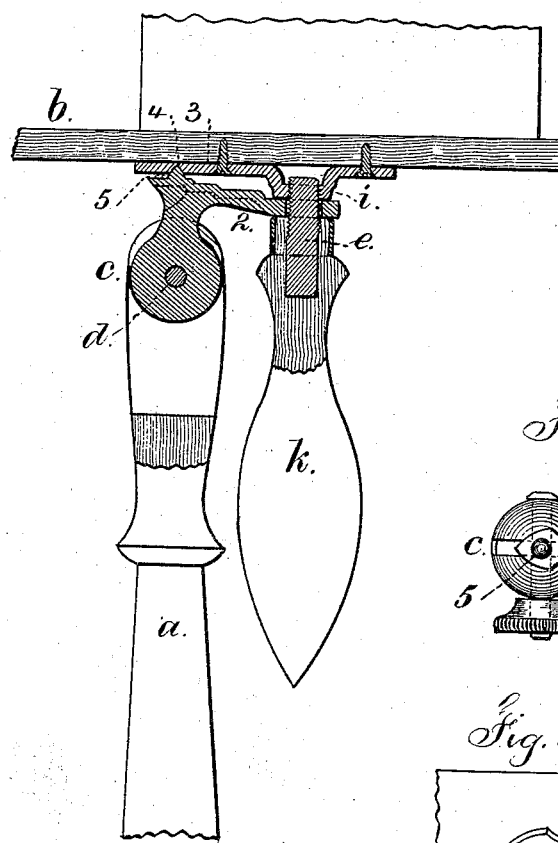
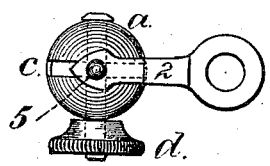
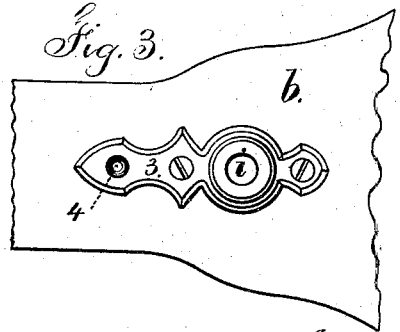

WILLIAM H. LEWIS, OF BROOKLYN, E. D., NEW YORK.

IMPROVEMENT IN STEREOSCOPES.

Specification forming part of Letters Patent No. 168,652, dated October 11, 1875; application filed January 19, 1875.

*To all whom it may concern:*

Be it known that I, WILLIAM H. LEWIS, of Brooklyn, E. D., Kings county, New York, have invented an Improvement in Stereoscopes, of which the following is a specification:

Stereoscopes have been made with a handle to be grasped in holding the instrument, and other instruments have been sustained upon a column and tipped into an inclined position by the joint between the column and stereoscope-base. In these cases the stereoscope is screwed upon the joint-link at the top of the column, and it is difficult to construct the parts so that the stereoscope screws down to the proper place, so as to be in line with the joint-link of the column.

I make use of a compound link and handle connection between the column and stereoscope-base, that insures a correct position of the instrument to the joint of the handle. Upon the column-joint there is a projecting arm through an eye, in which the screw of the handle passes into a nut screwed to the base of the stereoscope instrument, and from the nut a plate passes along the base, with a hole, into which a point projecting from the column-joint enters.

By this construction the two points of connection secure the instrument in line with the joint of the column, and the parts are clamped firmly, and the handle and its clamping-screw also serve for holding the instrument when it is not supported by the column.

In the drawing, Figure 1 is a section of the compound joint between the column and the stereoscope-base. Fig. 2 is a plan of the joint-link, and Fig. 3 is an inverted plan of the nut-plate.

The column $a$ and stereoscope-base $b$ are of usual character. $c$ is the column joint-link, that is tightened by the clamping-screw $d$, and this joint-link is made with an arm, 2, having a hole at the end through which the screw $e$ passes into the nut $i$. This screw $e$ is at the end of the handle $k$, and the nut $i$ is attached firmly to the base $b$, and is extended in the form of a plate, 3, in which is a hole, 4, for the stud 5 that projects above the joint $c$.

It will now be apparent that the stereoscope may be used with the handle $k$, screwed to the nut $i$; but when used with the column $a$ the arm 2 is clamped to the nut $i$ by the screw $e$, and the projecting stud 5, entering the hole 4, effectually prevents the stereoscope turning upon the screw and thereby becoming loose.

I claim as my invention—

1. The stud 5 upon the joint $c$, entering the hole 4 in the plate 3 of the nut $i$, in combination with the arm 2, screw-handle $k$, column $a$, and stereoscope $b$, substantially as set forth.

2. The arm 2 upon the joint-plate of the column, having a hole through which the screw $e$ of the handle $k$ passes, in combination with the nut $i$ upon the stereoscope-base, substantially as set forth.

Signed by me this 14th day of January, A. D. 1875.

WM. H. LEWIS.

Witnesses:
GEO. T. PINCKNEY,
CHAS. H. SMITH.